United States Patent [19]
Hashimoto et al.

[11] Patent Number: 5,769,910
[45] Date of Patent: Jun. 23, 1998

[54] FLOAT BATH FOR MANUFACTURING FLOAT GLASS

[75] Inventors: Toshiaki Hashimoto; Tetsuo Kimijima, both of Osaka, Japan

[73] Assignee: Nippon Sheet Glass Co., Ltd., Osaka, Japan

[21] Appl. No.: 751,952

[22] Filed: Nov. 19, 1996

[30] Foreign Application Priority Data

May 17, 1996 [JP] Japan .................................. 8-123357

[51] Int. Cl.$^6$ .................................................. C03B 18/16
[52] U.S. Cl. ....................................... 65/182.5; 65/182.1
[58] Field of Search ............................. 65/182.5, 182.3, 65/182.1

[56] References Cited

U.S. PATENT DOCUMENTS

| | | | |
|---|---|---|---|
| 3,427,142 | 2/1969 | De Lajarte | 65/182.5 |
| 3,481,729 | 12/1969 | Alonzo et al. | 65/182.5 |
| 3,767,375 | 10/1973 | Brichard et al. | 65/182.5 |
| 3,800,014 | 3/1974 | Brichard | 264/30 |

FOREIGN PATENT DOCUMENTS 4-29614   5/1992   Japan .

Primary Examiner—Donald E. Czaja
Assistant Examiner—Sean Vincent
Attorney, Agent, or Firm—Kanesaka & Takeuchi

[57] ABSTRACT

Bottom insulating bricks are laid on a casing bottom and side insulating bricks are disposed along casing sides. Bottom lining bricks are laid on the bottom insulating bricks and side lining bricks are disposed along the side insulating bricks. The side lining bricks are each provided with a projection formed at the upper portion thereof in such a manner as to project toward the side insulating bricks and with a downward face formed on the bottom of the projection to extend in the horizontal direction The side insulating bricks are each provided with a convex portion formed at the lower portion thereof in such a manner as to project toward the side lining bricks and with an upward face formed on the top of the convex portion to extend in the horizontal direction. The engagement between the downward face and the upward face prevents the rising of the side insulating brick.

12 Claims, 4 Drawing Sheets

FLOAT BATH FOR MANUFACTURING FLOAT GLASS

FIELD OF THE INVENTION

The present invention relates to a float bath for manufacturing float glass, more particularly, to a float bath which is provided with lining bricks and insulating bricks.

DESCRIPTION OF THE RELATED ART

A float bath for manufacturing float glass has a pool surrounded on all sides and bottom with lining bricks. The pool is filled with a molten metal (usually ,tin), and molten glass is poured onto the molten metal so that the glass spreads to become a sheet. Sheet glass (float glass) thus prepared has that upper and lower surfaces.

As disclosed in Japanese Patent Publication No. 4-29614, the outer hull of the float bath is made up of a casing made with a metal plate such as a steel plate. Insulating bricks cover the inner surface of the casing, and the insulating bricks are lined with lining bricks.

FIG. 3 is a sectional view of a conventional float bath 1' taken along a direction perpendicularly to the flow direction of the float glass, which is disclosed in the Japanese Patent Publication No. 4-29614.

A casing 2' has a casing bottom 2'$b$ and casing sides 2'$s$. Bottom insulating bricks 3'$b$ cover the casing bottom 2'$b$ and side insulating bricks 3'$s$ are disposed on the casing sides 2'$s$. Bottom lining bricks 4'$b$ are disposed on the bottom insulating bricks 3'$b$ and side lining bricks 4'$s$ are provided on the side insulating bricks 3'$s$ . The lining bricks 4'$b$, 4'$s$ constitute a shallow pool 5' in which molten tin 6' is laid. Inorganic adhesives (preferably, inorganic adhesives having permeability but not allowing the passage of molten tin) are filled between the insulating bricks 3'$b$ , 3'$s$ and the lining bricks 4'$b$, 4'$s$, thereby preventing the passage of the molten tin into the insulating bricks 3'$b$, 3'$s$.

The casing 2' has studs 7' as fixing members standing on the casing bottom 2'$b$ as shown in FIG. 4, to prevent the side lining bricks 4'$s$ from moving upward.

The side lining bricks 4'$s$ is provided with a slant face 4'$f$ which presses downward a slant face 3'$f$ of the side insulating bricks 3'$s$ whereby an upward movement of the side insulating bricks 3'$s$ is prevented by the side lining bricks 4'$s$.

Each stud 7' is inserted into a stud hole 8' formed in each side lining brick 4'$s$.

The float bath in FIG. 4 has the following defects (i) and (ii).

(i) Upon construction of the casing and lining thereof with the bricks, the float bath is heated up to a high temperature for manufacturing the float glass. The inorganic adhesives are sintered at the high temperature of this process so as to strongly bond the bricks to each other.

However, since the inorganic adhesives have relatively low adhesion strength before sintered at a high temperature, the bricks are likely to depart from each other and/or the casing when the bricks are lined or a thermal stress is caused during heating the float bath. In addition, a clearance ($\Delta t$) sometimes lies between the side bricks and the casing sides due to manufacturing error and/or working error of the bricks or the casing, Assuming that the angle of elevation of the faces 4'$f$, 3'$f$ against the horizontal line is $\theta$, when the inorganic adhesives depart from the bricks, the side insulating bricks 3'$s$ are risen from the casing bottom 2'$b$ by $\Delta t \cdot \tan \theta$.

When the angle $\theta$ is 80° and the clearance $\Delta t$ is 2 mm, a rising amount of the side insulating bricks 3'$s$ is 11.3 mm. (2×5.67=11.3 mm).

(ii) Each side lining brick 4'$s$ requires to have an enough thickness in the horizontal direction to be provided with the stud hole 8, so that each side insulating brick 3'$s$ has a small thickness in the horizontal direction.

OBJECT AND SUMMARY OF THE INVENTION

An object of the present invention is accordingly to significantly minimize the rising amount of side insulating bricks. It is another object of the present invention to give large thickness to side insulating bricks.

A float bath for manufacturing float glass according to the first aspect of the present invention comprises an open top metal casing having a casing bottom and casing sides extending upward from the edges of the bottom, insulating bricks, and lining bricks disposed inside the casing with the insulating bricks disposed therebetween, the float bath having a pool in which molten metal and molten glass are filled and in which a bottom and sides are formed by the lining bricks, wherein the insulating bricks include side insulating bricks and the lining bricks include side lining bricks which are disposed along the casing sides through the side insulating bricks and are fixed to the casing bottom by fixing members, wherein each side lining brick has a projection projecting toward the side insulating brick and a downward face formed at the bottom of the projection to extend in the substantially horizontal direction, each side insulating brick has an upward face extending in the substantially horizontal direction in such a manner as to fit the downward face of the projection, portions other than the downward and upward faces in the meeting faces between the side lining bricks and the side insulating bricks vertically extend, and the downward face and the upward face are engaged with each other, thereby preventing the upward movement of each side insulating brick.

In the float bath used in the manufacture of float glass as mentioned above, the upward movement of the side insulating bricks is prevented by engaging the downward faces, extending in the substantially horizontal direction, of the side lining bricks fixed to the casing bottom with the upward faces, extending in the substantially horizontal direction, of the side insulating bricks.

Therefore, there is no possibility of the side insulating bricks rising up even when inorganic adhesives disposed depart from the bricks and even with a space ($\Delta t$) between the side insulating bricks and the casing sides because the side insulating bricks are pressed downward by the side lining bricks.

It is preferable that each side insulating brick is provided with a convex portion to have a top extending in the substantially horizontal direction so that the top becomes the upward face.

According to the present invention, instead of the projections of the side lining bricks, each side lining brick and each side insulating brick may be provided with grooves formed in the respective facing faces thereof at the same level so that the upward movement of each side insulating brick is prevented by inserting a key into the grooves.

A float bath used in the manufacture of float glass according to the first aspect of the present invention comprises an open top metal casing having a casing bottom and casing sides extending upward from the edges of the bottom, insulating bricks, and lining bricks disposed inside the casing with the insulating bricks disposed therebetween, the float bath having a pool in which molten metal and molten glass are filled and in which a bottom and sides are formed by the lining bricks, wherein the insulating bricks include side insulating bricks and the lining bricks include side lining bricks which are disposed along the casing sides through the side insulating bricks, wherein the casing side is provided with a stopper projecting toward the side insulating bricks for preventing the upward movement of the side insulating bricks, the stopper being fitted with the side insulating bricks.

In the float bath used in the manufacture of float glass, the side insulating bricks are stopped directly by the casing sides, thereby preventing the upward movement of the side insulating bricks.

It is preferable that each side insulating brick has a projection projecting toward each side lining brick, and the projection is engaged into the side lining brick so as to prevent the upward movement of the side lining brick. No stud hole is necessary in the side lining bricks so that the thickness of each side lining brick can be decreased, thereby allowing greater thickness of each side insulating brick. This decreases the amount of lining brick which is relatively expensive and increases the amount of insulating brick which is relatively inexpensive. This also improves the heat retaining property of the float bath It is not necessary to form a stud hole having a complex configuration, thereby facilitating the process for the side lining bricks.

Instead of the projections formed in the side insulating bricks as mentioned above, the upward movement of each side insulating brick may be prevented by forming grooves formed in the respective facing faces of the side lining and side insulating bricks at the same level, and inserting a key into the grooves.

DESCRIPTION OF THE PREFERRED EMBODIMENT

Figure 1A:
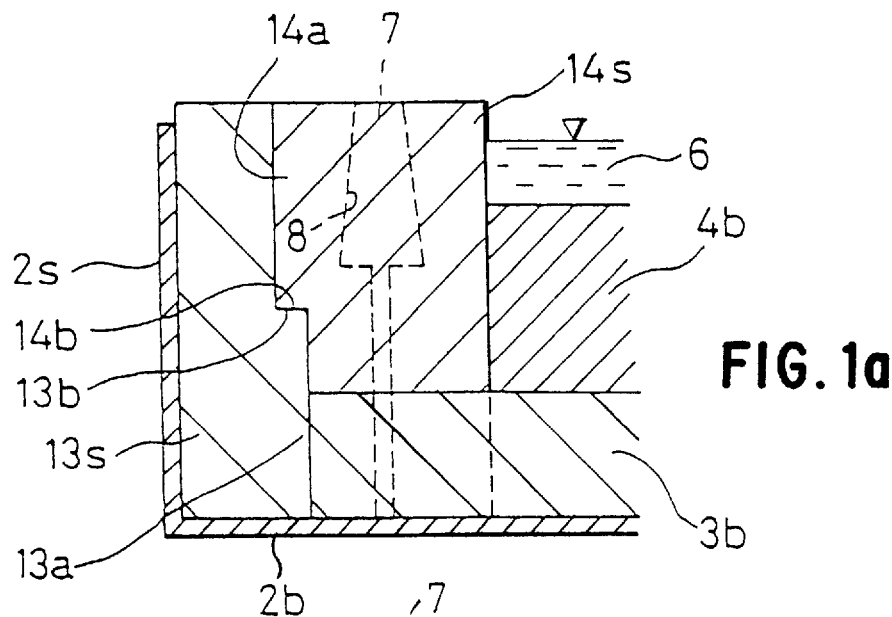
FIGS. 1a, 1b, and 1c are vertical sectional views of parts of float baths according to embodiments of the present invention

FIG. 1a is a sectional view of a side part of a float bath according to the first aspect of the present invention The float bath has side insulating bricks 13s disposed along casing sides 2s and side lining bricks 14s disposed along the side insulating bricks 13s. The side lining bricks 14s are each provided with a projection 14a formed in an upper portion thereof in such a manner as to project toward the side insulating bricks 13s, and with a downward face 14b formed at the bottom of the projection 14a in such a manner as to extend in the horizontal direction. The side insulating bricks 13s are each provided with a convex portion 13a formed in a lower portion thereof in such a manner as to project toward the side lining bricks 14s, and with an upward face 13b formed on the top of the convex portions 13a in such a manner as to extend in the horizontal direction. The engagement between the downward face 14b and the upward face 13b prevents the rising of the side insulating brick 13s.

The meeting faces of the bricks 14, 13 other than the downward face 14b and the upward face 13b extend vertically.

Figure 4:
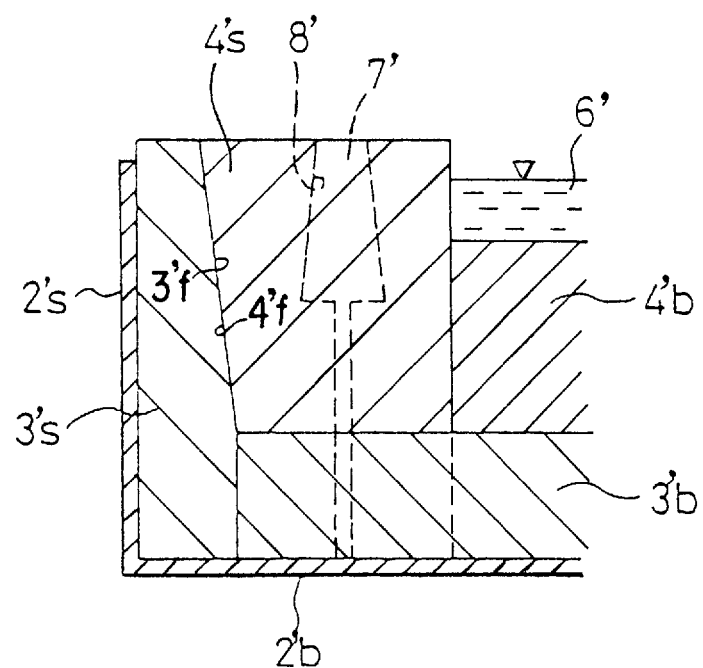
FIG. 4 is a vertical sectional view of a part of the conventional float bath.

The other components of the float bath of FIG. 1a are the same as the float bath of FIG. 4 so that the same components are marked by the same numerals without an apostrophe.

The float bath as structured above is prevented the brick 13s from rising up even when inorganic adhesives between the bricks 13s and 14s depart from the bricks 13s and/or 14s.

Figure 1B:
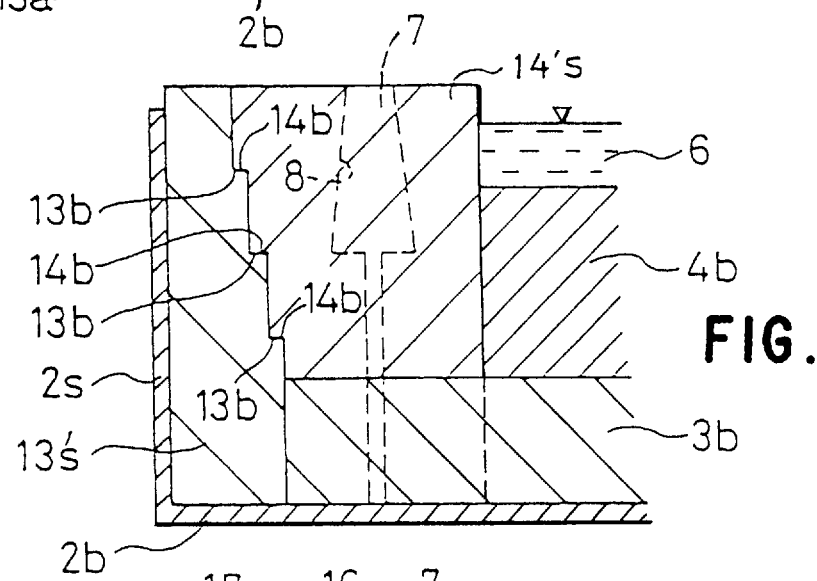
Figure 1C:
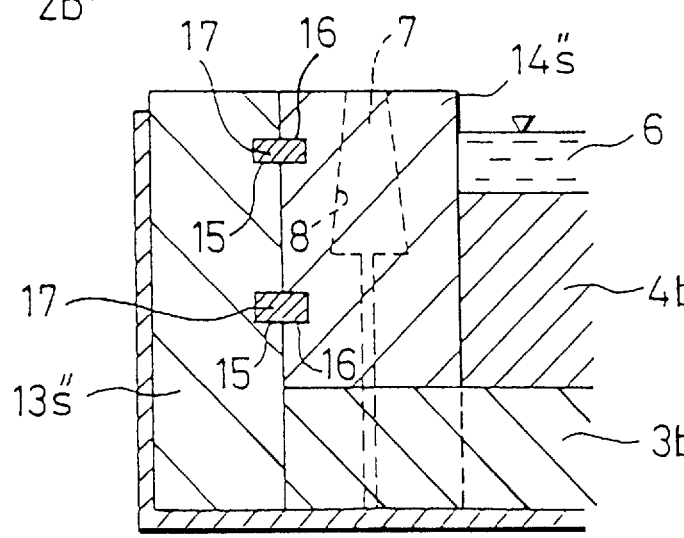

In FIG. 1a one pair of the upward face 13b and the downward face 14b is formed in the bricks 13s and 14s on the vertical way. Therefore, the configurations of the side insulating bricks 13s and the side lining bricks 14s are simple so as to permit easy manufacturing process of the bricks 13s, 14s. However, the present invention is not limited thereto, and several pairs of the upward face and the downward face may be formed in each meeting face of side insulating bricks 13's and side lining bricks 14's as shown in FIG. 1b.

In the present invention, the upward movement of side insulating bricks 13"s may be prevented by grooves 15, 16 provided at meeting faces of side insulating brick 13"s and side lining brick 14"s and keys 17 inserted thereinto.

It should be noted that the inorganic adhesives may be omitted.

FIGS. 2a through 2d a are sectional views of side parts of float baths for manufacturing float glass according to the second aspect of the present invention.

Figure 2A:
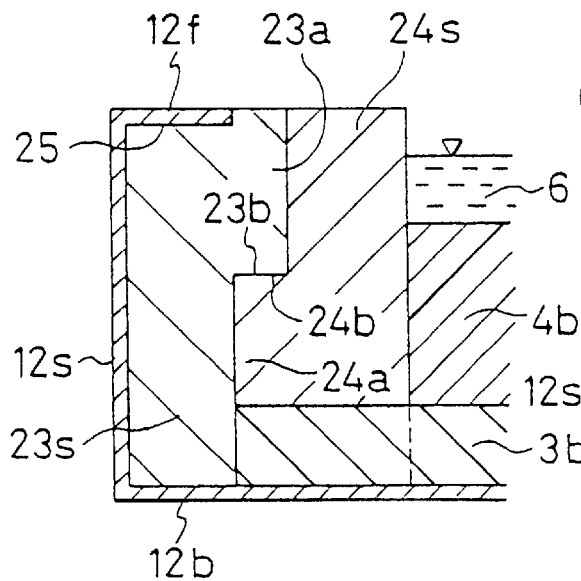
FIGS. 2a, 2b, 2c, and 2d are vertical sectional views of parts of float baths according to other embodiments.

A float bath shown in FIG. 2a has a casing 12 which is provided with a flange 12f horizontally extending from the upper end of a casing side of the casing 12 over the tops of side insulating bricks 23s, whereby the side insulating bricks 23s are prevented from moving upward. The side insulating bricks 23s are each provided with a projection 23a formed in an upper portion thereof in such a manner as to project toward side lining bricks 24s, and with a downward face 23b formed at the bottom of the projection 23a in such a manner as to extend in the horizontal direction. The side lining bricks 24s are each provided with a projection 24a formed in a lower portion thereof in such a manner as to project toward the side insulating bricks 23s and with an upward face 24b disposed at the top of the projection 24a in such a manner as to extend in the horizontal direction. The engagement between the upward face 24b and the downward face 23b prevents the rising of the side lining brick 24s. In this embodiment, there is no stud hole and no stud. To decrease heat dissipation through the flange 12f and to prevent heat damage of the flange 12f, it is preferable that the flange 12f is disposed apart from the side lining bricks 24s.

In this embodiment, the thickness of each side lining brick 24s can be decreased because of no stud hole, thereby allowing greater thickness of each side insulating brick 23s than the insulating bricks 13s, 13's , 13"s.

The brick 23s is prevented from rising up even when inorganic adhesives disposed between the bricks 23s and 24s depart from the bricks 23s and/or 24s. The inorganic adhesives may be omitted also in these embodiments.

Figure 2B:
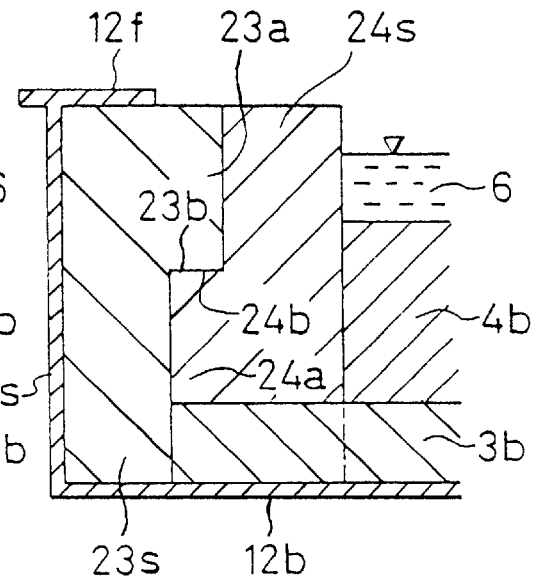
Figure 2C:
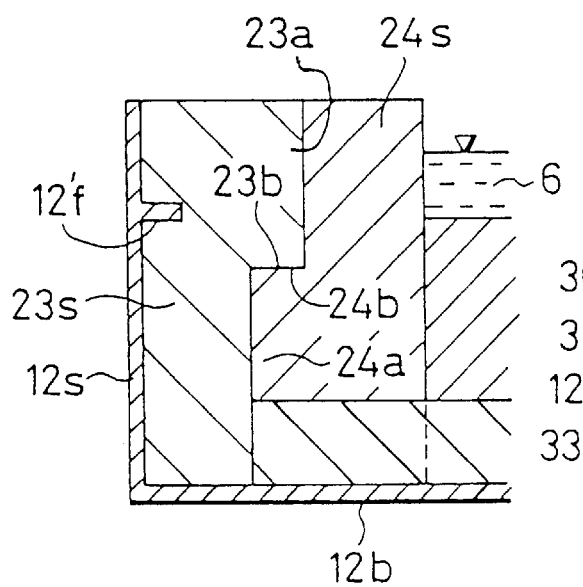

Though the side insulating brick 23a is provided with a concave portion 25 in the top thereof into which the flange 12f is adapted in FIG. 2a, the concave portion may be omitted as shown in FIG. 2b. The flange 12'f may be formed at any hight of the vertical side 12s as shown in FIG. 2c.

Figure 2D:
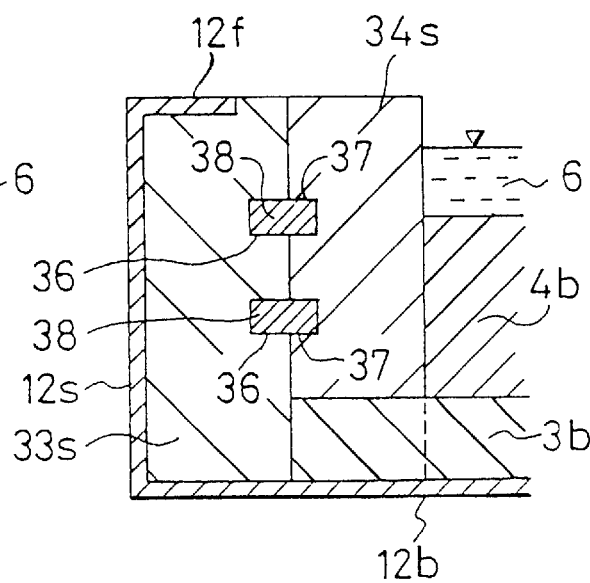
Figure 3:
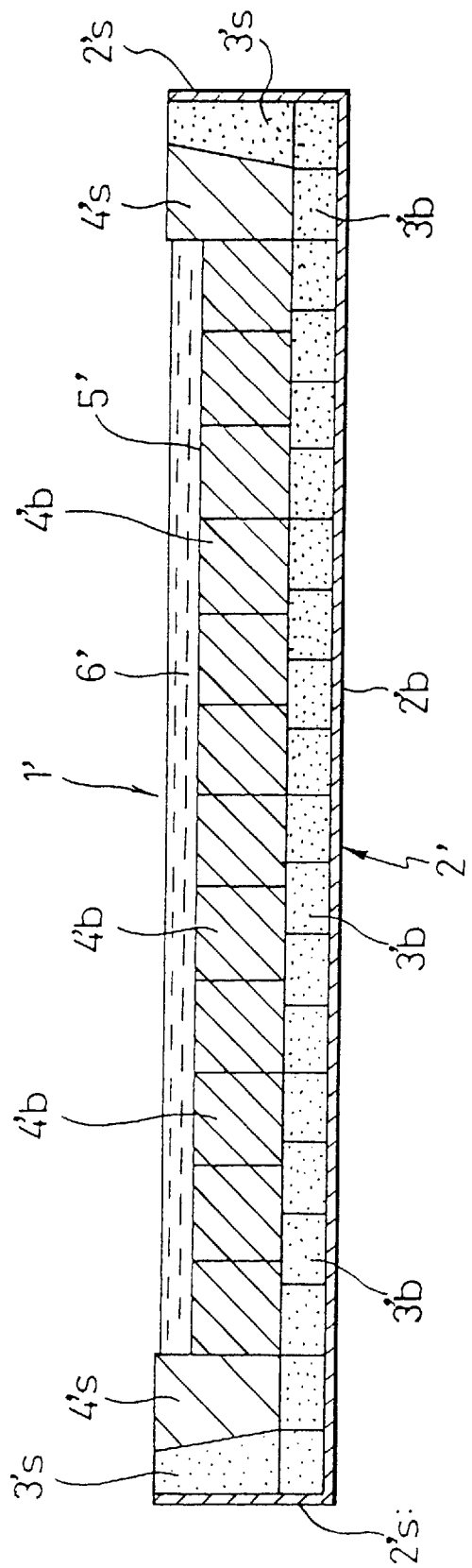
FIG. 3 is a vertical sectional view of a conventional float bath.

In a float bath shown in FIG. 2d, the flange 12f presses downward side insulating bricks 33s. The side insulating bricks 33s and side lining bricks 34s are provided with grooves 36, 37 in the meeting faces therebetween. Keys 38 are inserted into the grooves 36, 37, respectively to prevent upward movement of the side lining bricks 34s.

In the embodiments shown in FIGS. 2a through 2d, several pairs of the upward face and the downward face may be formed in each meeting face to form multiple stages as in the float bath shown in FIG. 1b. The side lining bricks and the side insulating bricks may have slant meeting faces, thereby preventing the upward movement of the lining bricks. In this case, the slant of the meeting faces is the reverse of that in FIG. 4, that is, the side insulating bricks have over hung slant faces.

As mentioned above, in the float bath according to the present invention the side insulating bricks are prevented from rising up. The side lining blicks may have small thickness so as to allow the side insulating bricks to have large thickness, whereby the heat insulating property of the float bath is improved to reduce energy consumption in manufacturing float glass.

What is claimed is:

1. A float bath for manufacturing float glass, comprising:
    a metal casing having a casing bottom and casing sides extending upward from edges of the casing bottom,
    insulating bricks comprising side insulating bricks covering the casing side, each of said side insulating bricks having an upward face extending in a horizontal direction,
    lining bricks comprising side lining bricks lining the insulating bricks, each of said side lining bricks having a projection projecting toward the side insulating brick and a downward face formed at a bottom of the projection to extend in a horizontal direction, said downward face fitting the upward face of the side insulating brick so that the downward face and the upward face engage with each other to prevent the side insulating brick from moving upward, and
    a fixing member to fix the side lining bricks to the casing bottom.

2. A float bath as claimed in claim 1, wherein the projection is formed integrally with the side lining brick in such a manner as to project toward the side insulating brick, each side insulating brick is provided with a convex portion and said upward face is formed on the top of the convex portion.

3. A float bath as claimed in claim 1, wherein one pair of the upward face and the downward face is provided in each meeting face of said insulating brick and said lining brick.

4. A float bath as claimed in claim 1, wherein a plurality of pairs of the upward face and the downward face are provided in each meeting face of said insulating brick and said lining brick.

5. A float bath used for manufacturing float glass comprising a metal casing having a casing bottom and casing sides extending upward from edges of the bottom,
    insulating bricks comprising side insulating bricks covering the casing sides,
    lining bricks comprising side lining bricks lining the side insulating bricks,
    a fixing member to fix the side lining bricks to the casing bottom,
    grooves formed in respective facing faces at the same level of said side lining brick and said side insulating brick, and
    a locking member inserted into said grooves to prevent said side insulating brick from moving upward.

6. A float bath used as claimed in claim 5, wherein a plurality of pairs of the grooves is formed in each meeting face.

7. A float bath used for manufacturing float glass, comprising:
    a metal casing having a casing bottom and casing sides extending upward from edges of the casing bottom,
    insulating bricks comprising side insulating bricks covering the casing sides and having dents at sides facing the casing sides,
    lining bricks comprising side lining bricks lining the side insulating bricks, and
    a stopping member integrally formed with said metal casing and projecting toward said side insulating bricks, said stopping member entering into and engaging with the dents for preventing an upward movement of said side insulating bricks.

8. A float bath as claimed in claim 7, wherein each side insulating brick has a projection projecting toward each side lining brick, and the projection is engaged into the side lining brick so as to prevent the upward movement of the side lining brick.

9. A float bath as claimed in claim 7, wherein each side lining brick and each side insulating brick are provided with grooves formed in the respective facing faces thereof at the same level, and
    a locking member is inserted into the grooves so that the upward movement of each side insulating brick is prevented.

10. A float bath as claimed in claim 9, wherein a plurality of pairs of the grooves is formed in each meeting face.

11. A float bath as claimed in claim 7, wherein said stopping member extends horizontally from one of the casing sides toward the side insulating bricks.

12. A float bath as claimed in claim 8, wherein said projection has a horizontal downward face, and said lining brick has a horizontal upward face engaging the downward face of the projection.

* * * * *